Figure 1:
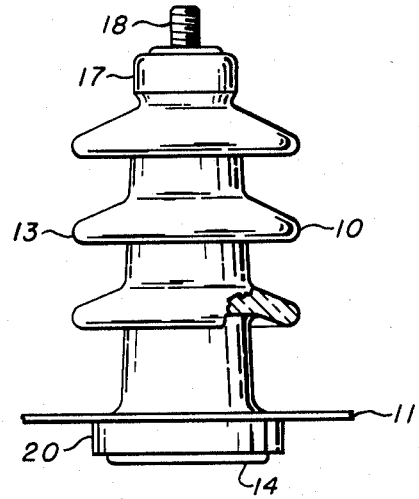

June 21, 1966     D. E. RAUDABAUGH     3,257,502
COMPRESSION JOINT FOR BUSHING INSULATOR Filed Dec. 9, 1963     2 Sheets-Sheet 1

INVENTOR.
DONALD E. RAUDABAUGH
BY
ATTORNEY

INVENTOR.
DONALD E. RAUDABAUGH
BY
ATTORNEY

United States Patent Office 3,257,502
Patented June 21, 1966

3,257,502
COMPRESSION JOINT FOR BUSHING INSULATOR
Donald E. Raudabaugh, Mansfield, Ohio, assignor to The Ohio Brass Company, Mansfield, Ohio, a corporation of New Jersey
Filed Dec. 9, 1963, Ser. No. 329,115
12 Claims. (Cl. 174—152)

This invention relates to improved methods of manufacturing electrical apparatus housings and insulating bushings.

A principal object of the invention is to facilitate the manufacture of electrical apparatus housings and insulating bushings therefor.

Another object of the invention is to provide an improved seal between an insulating bushing and an aluminum apparatus housing for electrical apparatus.

In capacitors and like apparatus for use in electric power lines and substations, it is known to incorporate the capacitor elements or other apparatus in a weatherproof housing to unitize and protect the equipment. In such arrangements, it is required to provide ceramic through bushings as lead-ins to provide electrical connection between the capacitor elements on the interior of the housing and the power lines or other conductors at the exterior thereof. Aluminum sheet is a desirable material for the housing because of the combined electrical, mechanical and thermal characteristics of aluminum, but difficult manufacturing and assembly problems are presented.

Compression rings have certain advantages when used to effect a joint and seal between a porcelain insulating bushing and an aluminum container. Specifically, the thermal characteristics of the materials can be chosen so that the seal is effective over a wide range of temperatures, such as is required in capacitors for outdoor applications. However, I have found that certain arrangements of the parts and certain manufacturing procedures are required in manufacture to achieve useful results.

I have found that substantial improvement in manufacture may be achieved by first making the flange and ring into a subassembly and then assembling the bushing with the flange and ring by positioning the flange and ring in a die and pressing the bushing into the flange opening. The flange and ring may be made by plunging the flange into the ring from a sheet metal blank.

The improved procedure referred to above is facilitated by the use of a compression ring having a substantially rectangular cross section. Assembly of the bushing into the flange is facilitated by grinding the exterior of the bushing with a tapered cylindric surface to enable movement of the bushing into the flange without damage to the flange. The interior of the ring is formed with a tapered interior surface and the material of the flange is plastically deformed in the radial direction of the members to conform to the tapered exterior surface of the bushing for load distribution over the width of the ring. The exterior surface of the bushing is coated with an epoxy adhesive to provide a measure of lubrication between the exterior surface of the bushing and interior surface of the flange during assembly and to bond the parts after assembly is complete.

The invention makes possible and practical manufacture of compression ring joints with ceramic insulating bushings and other bushing parts and economic utilization thereof in electrical apparatus such as capacitors.

The invention, together with further objects, features, and advantages thereof, will be further understood by reference to the following specification and claims and to the drawings.

Figure 2:
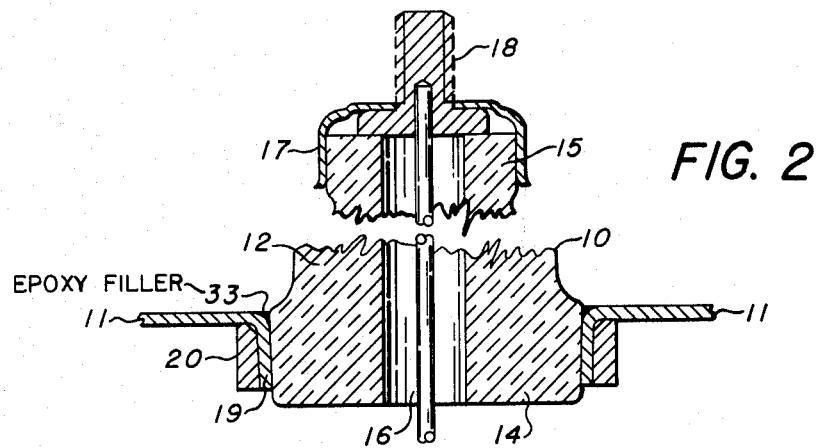
Figure 6:
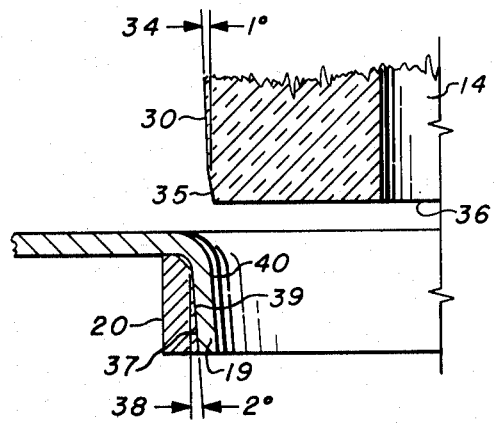
Figure 3:
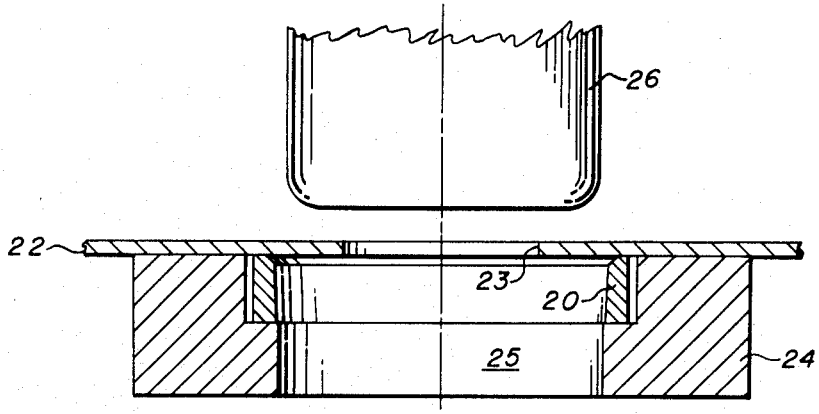
Figure 4:
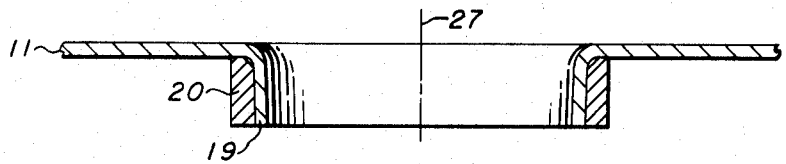
Figure 5:
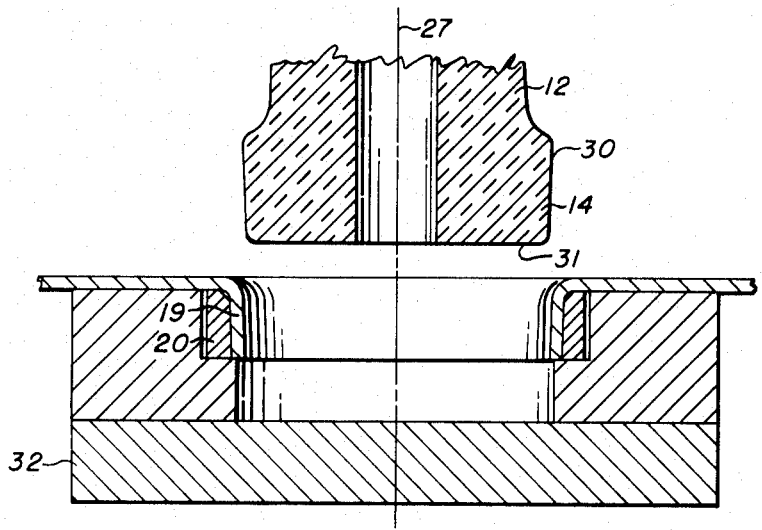

In the drawings:
FIG. 1 is a side elevation view of a bushing and a portion of a container of a power capacitor;
FIG. 2 is a vertical sectional view of the apparatus of FIG. 1, showing the bushing, flange, and seal of the invention;
FIG. 3 is a sectional view showing a step in the manufacture of the flange and compression ring of the invention;
FIG. 4 is a sectional view of the assembled flange and compression ring;
FIG. 5 illustrates the method of assembling the bushing with the flange and compression ring; and
FIG. 6 is an enlarged sectional view showing the related features of the parts.

In the apparatus of FIGS. 1 and 2, an insulating bushing 10 is carried by a metal wall 11 of an electrical apparatus housing, such as an aluminum wall of a capacitor container. The bushing 10 comprises a porecelain body 12 formed with circumferentially extending ribs 13, a base 14, and top 15. The body 12 has a central opening 16 for receiving an electrical conductor from the apparatus within the container, and carries a cap 17 and terminal 18 to constitute a terminal for the apparatus within the container.

In accordance with the invention, the base 14 of the body 12 is received within a flange 19 constituted as an integral extension of the wall 11, and the flange 19 is held in fluid-sealed contact with the exterior surface of the body 12 by a compression ring 20. Elastic forces in the ring 20, generated by reason of the interference relation between the base 14, flange 19, and ring 20 are exerted upon the flange 19 by the ring 20 and hold the flange 19 in elastically and plastically deformed engagement with the exterior surface of the body 12.

The bushing and flange arrangement is manufactured in two distinct procedures: first, the flange 19 is formed in the wall 11 of the apparatus container with the ring 20 in place on the flange; the bushing 10 is then assembled with the flange 19 and ring 20 to form the bushing-container assembly. The bushing is completed by separate assembly of the cap 17 on the top end 15 of the bushing body 12.

The first manufacturing procedure referred to above is illustrated in FIG. 3 and FIG. 4 of the drawing. As shown in FIG. 3, a blank or piece 22 of flat metal is prepared by forming an opening 23 in the piece, the opening 23 having a diameter predetermined with reference to the diameter of the bushing 10. The compression ring 20 is manufactured by machining metal tubing into a piece having a generally rectangular cross section and the interior surface cylindric and straight or tapered along the axis of the ring. The interior corner of the ring is rounded to prevent damage to the adjacent portions of the wall 11. The ring is made of mild steel, such as C-1015, or other material having the mechanical and thermal characteristics required in the device.

The ring 20 is positioned in a metal form or die 24 having an opening 25 aligned with the opening of the ring 20 and aligned with a head 26 of a hydraulic press. The press is then actuated, and the head 26 moves against the adjacent portion of the piece 22, forcing the metal of the piece 22 into and through the opening of the ring 20. After withdrawal of the head 26, the piece 22 and the flange 19 and the ring 20 constitute a subassembly for assembly with the bushing 10.

The diameter of the head 26, the opening 23, and the ring 20 are so adjusted that the material of the piece 22 which forms the flange 19 is forced against the interior surface of the ring 20, which is expanded within its elastic range while the head 26 is in position within the flange 19. The movement of the head 26 produces a plastic deformation or flow of the material of the piece 22 so that the flange 19 conforms closely to the interior surface of the ring 20. Upon withdrawal of the head 26, the elastic contraction of the ring 20 causes a slight inward movement of the flange 19. The exterior surface of the head 26 and the interior surface of the flange 19 is substantially concentric with the axis 27 of the parts so that the interior surface of the flange 19 has a uniform cylindric extent.

The bushing body 12 is manufactured according to known procedures and has the exterior surface suitably glazed. The exterior cylindric surface 30 of the base 14 is taper ground for reasons which will appear hereinafter. After grinding and prior to assembly with the flange 19 and ring 20, the surface 30 is coated with an epoxy adhesive paste such as Hysol 4322. The assembly comprising the flange 19 and the ring 20 is then placed in a press having a bed 32, and the body 12 is moved along the axis 27 so that the base end 14 of the bushing body is forced into the flange 19. The final position of the base 14 in the flange 19 is shown in FIG. 2.

A body 33 of epoxy resin or varnish is applied along the exterior of the flange 19 between the exterior surface 30 of the base 14 and the wall 11. The body 33 fills the space between the bushing body 12 and the wall 11 to form a smooth exterior surface between the parts and prevent accumulation of moisture, contaminants, etc. Varnish or other protective coatings may be applied to the interior extremity of the flange at the base 14.

After assembly of the bushing body 12 with the flange 19 and ring 20, the body 12 is secured in a suitable fixture and the cap 17 is pressed on the top end 15 of the body 12. The exterior surface of the top end 15 of the body 12 is ground to substantially the same taper as the surface 30 of the base end 14 and has the exterior surface coated with epoxy adhesive paste prior to assembly with the cap 17.

The completed assembly is baked to cure the epoxy resins. The entire assembly is fired for a period of time determined by the particular material employed. After curing, the parts are cleaned and assembled with other parts of the container, etc.

The cooperative features of the base 14, the flange 19, and the ring 20 are shown in greater detail in FIG. 6. As there shown, the surface 30 is formed with a taper of in the order of one degree from the axial direction, indicated at 34, along the greater portion of its length. A surface 35 at the extremity of the base 14, extending between the surface 30 and the end face 36 of the bushing body 12, is formed with a taper of in the order of four degrees. The ring 20 is formed with an interior surface 37 having a taper of about two to three degrees inward in the axial direction, indicated at 38. The flange 19 is formed with an exterior surface extending along and in contact with the interior surface 37 of the ring 20 and a cylindric interior surface 40 by the drawing operation described in connection with FIG. 3 and FIG. 4.

The tapered surfaces 30 and 35 facilitate movement of the base 14 into the flange 19 during assembly of the bushing body 12 with the subassembly comprising the flange 19 and ring 20. The convergent surfaces, together with the lubricating effect of the raw epoxy adhesive, enables relative axial movement of the parts without gouging, scratching, or other physical damage to the interior of the flange 19. Accordingly, the parts may be assembled by a simple pressing operation while achieving mechanical and structural uniformity required for proper functioning of the apparatus in accordance with the design.

The conformal tapers of the interior surfaces 37 of the ring 20 and the exterior surface 30 of the base 14 insure substantially uniform contact between the parts and uniform loading of the ring 20 across the width of the ring. That is, the movement of the base 14 into the flange 19 results in a plastic modification of the material of the flange 19 in the radial direction thereof while the flange undergoes elastic expansion in the circumferential direction with the ring 20 sufficient to insure contact between the flange and the bushing and the flange and the ring throughout the width of the ring. It is necessary that the ring 20 be loaded across the width of the ring for uniform expansion and contraction of the parts in the elastic range of the parts over the greatest possible temperature range.

A considerable variation in the disposition and arrangement of the parts described above is possible within the scope of the invention. Thus, the surface 30 may be cylindric, that is, of constant diameter along the longitudinal axis of the parts, rather than tapered as indicated at 34, and the surface 35 and the lubricating effect of the epoxy adhesive relied upon for proper entry of the base 14 into the flange 19. The interior surface 37 of the ring 20 may be cylindric, of constant diameter along the longitudinal axis of the parts and the surface 30 tapered, substantially as described, to insure plastic deformation of the flange 19 to the extent required for uniform loading of the ring 20. It will be recognized that the embodiment of FIG. 6 is a preferred embodiment of the invention and that the modifications just described are limiting forms of the device. A reverse taper of the surface 30 is undesirable inasmuch as plastic modification of the material of the flange by that portion of the body 12 at the juncture of the surfaces 30 and 35 during movement of the bushing body into the flange would result in non-uniform loading of the compression ring 20.

The angles of taper, etc., specifically set forth above and in FIG. 6, are useful for aluminum walls and flanges and porcelain bushings, such as are used in power capacitors.

The cooperation of the parts is such that a mechanical bond is formed between the interior of the flange and the ground exterior of a procelain body. Accordingly, for some embodiments of the invention not requiring a hermetic seal, the epoxy adhesive may be omitted. Also, other lubricant materials, not incompatible with the materials of the flange and the body of the bushing and not necessarily having adhesive or sealing properties, may be utilized within the spirit of the invention.

A bushing for a power capacitor was manufactured in accordance with the invention, utilizing a porcelain body in an aluminum container wall with a mild steel compression ring. The porcelain body was coated with glaze except along the exterior surfaces at the ends of the body. The flange and ring were manufactured as a subassembly, as described herein. The porcelain body was prepared for assembly by grinding the surface 30 to an angle of one degree from the axial direction and epoxy adhesive in paste form was applied to the surface 30 prior to assembly of the body with the subassembly comprising the flange and ring. The exterior surface of the top end 15 of the bushing body was ground to an angle of one degree and coated with epoxy adhesive and the cap 17 assembled on the bushing body as described herein. The completed assembly was baked until the epoxy adhesive was hardened.

In push-out tests, the bushing withstood forces applied between the wall 11 and the body 12 in excess of 4,000 pounds without leakage and in excess of 10,000 pounds for physical separation. On torque tests, 80 foot-pounds of torque were applied between the porcelain body and the wall 11 without separation or leakage between the parts. On thermal tests, 70 consecutive thermal cycles from 50° below to 250° above 0° F. were completed without leakage between the parts.

Utilization of the joint of the invention in electrical apparatus containers has the following advantageous results:

(1) The parts may be designed to accommodate the thermal characteristics of the materials and to achieve the necessary compressive relation of the ring with the flange and bushing body over a wide range of temperatures.

(2) The functioning of the joint and seal is substantially independent of the chemical nature of the material. Accordingly, limitations resulting from the requirement of solderability in prior art ceramic-metal joints are avoided.

(3) Manufacturing procedures are greatly simplified and costs of production are reduced as compared with soldered ceramic-metal joints.

(4) The joint described herein will accommodate a substantial manufacturing variation in the dimensions of the parts so that production may be accomplished at economically acceptable costs.

Accordingly, the joint of the invention facilitates design of electrical apparatus containers in that materials may be chosen for their strength, anti-corrosion characteristics, and the like. The invention is useful where it is desired to use aluminum or stainless steel as the container material.

The term "pressing" is used in the claims as a relative term and either of the flange or bushing parts may be held fixed and the remaining part moved in assembly of the parts.

It is to be understood that the foregoing description is not intended to restrict the scope of the invention and that various rearrangements of the parts and modifications of the design may be resorted to. The following claims are directed to combinations of elements which embody the invention or inventions of this application.

I claim:

1. That method of manufacturing a joint between a metal part and an insulator having a longitudinal axis and a cylindric exterior surface adjacent one extremity thereof, which comprises:
   (a) making an annular metal compression ring having a rectangular cross section of substantial width in the axial direction of the insulator;
   (b) making an assembly comprising a tubular flange on the metal part with the compression ring extending about the exterior of the flange in compressive engagement therewith; and
   (c) assembling the insulator concentrically within the flange and the ring by pressing the insulator into the flange opening from the side of said metal part opposite the ring, the movement of the insulator into the flange expanding the flange and the ring in the radial and circumferential directions thereof and loading of the compression ring to a predetermined tension and across the width of the ring.

2. That method in accordance with claim 1, the assembly comprising the tubular flange and compression ring being formed by plunging a flat portion of the metal part into the interior of the compression ring and into engagement with the interior surface of the ring to plastically expand the material of the flange and elastically expand the material of the ring and predetermined the size and characteristics of the flange and ring for assembly with the insulator.

3. That method in accordance with claim 2, in which the exterior surface of the insulator and the interior surface of the ring are convergently related in the direction of movement of the insulator into the flange to facilitate movement of the insulator into the flange.

4. That method in accordance with claim 1, in which the exterior surface of the insulator is coated with raw epoxy resin prior to assembly thereof in the flange, the epoxy resin lubricating the contacting surfaces of the flange and insulator to facilitate relative movement thereof, and thereafter curing the resin to bond and seal the flange and insulator.

5. That method in accordance with claim 1, in which the insulator is assembled within the flange by holding the flange and ring in a die with the flange received in the ring, and moving the insulator toward the die and into the flange and ring.

6. An electrical apparatus bushing in which there is an insulator body comprising a first part having a longitudinal axis and a cylindric exterior surface at one extremity thereof, a second part of metal extending circumferentially about the first part and a flange integral with the second part extending axially along the exterior surface of the first part in contact therewith, that improvement which comprises a metal compression ring having a temperature coefficient of expansion substantially that of the first part and a rectangular cross section of substantial width in the axial direction of the first part, the said ring extending about and axially along the flange in contact therewith and contracting in the circumferential direction thereof to compress the flange against the exterior surface of the first part, the flange being coextensive with the ring along the exterior surface of the first part and being plastically conformed to the exterior surface of the first part and the interior surface of the ring and uniformly loading the ring in the axial and circumferential directions thereof to a tension providing substantially concurrent expansion and contraction of the first part, second part, and ring with change in temperature thereof.

7. An electrical apparatus bushing in accordance with claim 6, in which the compression ring has the interior surface tapered radially away from the first part in the direction of the first part from the said extremity thereof, and the first part has the exterior surface tapered in the axial direction thereof at an angle smaller than the angle of the said interior surface, and the flange extends between the two tapered surfaces conformally thereto.

8. An electrical apparatus bushing in accordance with claim 6, in which the exterior surface of the first part has a substantially constant radius along the longitudinal axis of the part and the compression ring has the interior surface tapered radially away from the first part in the direction of the first part from the said extremity thereof with a small angle between the line of said surface and the exterior surface of the first part.

9. An electrical apparatus bushing in accordance with claim 6, in which there is a thin layer of cured resin adhesive between the flange and the insulator body, bonded thereto and sealing the joint between the first part and second part.

10. That method of manufacturing a joint between a metal first part and a second part having a cylindric exterior surface adjacent one end thereof, which comprises making an annular metal ring having a rectangular cross section of substantial width relative to the said exterior surface of the second part, making an assembly comprising a tubular flange on the first part and the metal ring extending about the exterior of the flange in compressive engagement therewith, coating the exterior surface of the second part with a raw adhesive adapted to lubricate the contacting surfaces of the first part and second part during relative movement thereof, and assembling second part concentrically within the flange and the ring by pressing the second part into the flange opening from the side of the first part opposite the ring, the movement of the second part into the flange expanding the flange and the ring to permit passage thereof into and through the flange, deform the flange into contact with the first part and the ring across the width of the ring, and load the ring in tension.

11. That method in accordance with claim 10, in which the raw adhesive is an epoxy resin, and thereafter curing the resin to bond and seal the insulator and flange.

12. That method in accordance with claim 11, in which the second part has the exterior surface tapered outward at a small angle at the one end thereof pressed into the second part, the ring has the interior surface tapered outward in the direction of the second part with a small angle between the line of the said interior surface and the exterior surface of the second part in the direction of the first part upon entry thereof into the second part, to facilitate movement of the first part into the second part and uniform loading of the ring across the width thereof.

References Cited by the Examiner

UNITED STATES PATENTS

| | | | |
|---|---|---|---|
| 2,230,241 | 2/1941 | Franklin | 29—523 X |
| 2,852,722 | 9/1958 | Noon. | |
| 3,009,013 | 11/1961 | Raue et al. | 174—152 |

FOREIGN PATENTS 659,223  10/1951  Great Britain.

ROBERT K. SCHAEFER, *Primary Examiner.*

LARAMIE E. ASKIN, JOHN F. BURNS, *Examiners.*